US006574192B1

United States Patent
Egnell

(10) Patent No.: US 6,574,192 B1
(45) Date of Patent: Jun. 3, 2003

(54) COMMUNICATIONS NETWORK AND AN ADD AND DROP NODE

(75) Inventor: Lars Egnell, Saltsjöbaden (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/333,650

(22) Filed: Jun. 16, 1999

(30) Foreign Application Priority Data

Jun. 17, 1998 (SE) .............................. 9802169

(51) Int. Cl.[7] .......................... G01R 31/08; H04L 12/28
(52) U.S. Cl. ....................... 370/224; 370/403
(58) Field of Search ............... 370/364, 365, 370/403, 404, 405, 406, 424, 452, 460, 228, 227, 222, 217, 221, 225, 242, 244, 224; 359/110

(56) References Cited

U.S. PATENT DOCUMENTS

| 5,680,235 A | | 10/1997 | Johansson | |
|---|---|---|---|---|
| 6,046,832 A | * | 4/2000 | Fishman | 359/119 |
| 6,049,405 A | * | 4/2000 | Oberg | 359/119 |
| 6,088,141 A | * | 7/2000 | Merli et al. | 359/110 |
| 6,233,704 B1 | * | 5/2001 | Scott et al. | 714/717 |

FOREIGN PATENT DOCUMENTS

| EP | 0 765 051 | 3/1997 |
|---|---|---|
| EP | 0 769 859 | 4/1997 |
| SE | 507 501 | 6/1998 |
| WO | 96/24998 | 8/1996 |
| WO | 96/31025 | 10/1996 |
| WO | 97/01905 | 1/1997 |
| WO | 99/03230 | 1/1999 |

OTHER PUBLICATIONS

Johansson, et al., "Flexible bus: A self–restoring optical ADM ring architecture", *Electronics Letters*, Dec. 5, 1996, vol. 32, No. 25, pp 2338–2339.

* cited by examiner

Primary Examiner—Wellington Chin
Assistant Examiner—Brenda Pham

(57) ABSTRACT

A communications network comprising at least two nodes is disclosed. The network has two communication paths that carry traffic in opposite directions and work as a bi-directional bus. The network has a first inactive segment that carries no traffic and is arranged to allow the first inactive segment to be made active and another segment to be made inactive, especially in the case of fault in the other segment. The activation and inactivation logically "move" the first inactive segment. Additional protection paths are provided between the nodes.

7 Claims, 8 Drawing Sheets

COMMUNICATIONS NETWORK AND AN ADD AND DROP NODE

The application claims priority under 35 U.S.C. §§119 and/or 365 to 9802169-4 filed in Sweden on Jun. 17, 1998; the entire content of which is hereby incorporated by reference:

TECHNICAL FIELD

The invention relates to a communications network and also to an add and drop node and an error handling method in such a network.

BACKGROUND

There exist different types of communication networks, with different ways of taking care of errors. There also exist different types of multiplexing in communication networks, such as frequency division multiplexing (FDM), time division multiplexing (TDM) and wavelength division multiplexing (WDM).

Optical multi-channel systems employing wavelength multiplexing are used both in new networks and in order to enhance the transmission capability of existing optical fiber networks. Thus, information channels that previously had to be transmitted on a plurality of separate fiber pairs can be forwarded in a single fiber pair in WDM networks.

Using optical wavelength division multiplexed channels means that a plurality of serial information signals, i.e. a plurality of serial binary signals, are transmitted on the same optical fiber. Each serial signal is modulated on a carrier of its own, having a definite wavelength clearly separated from the other carriers. These modulated light signals are then combined in an optical coupler or optical multiplexer arrangement to a composite light signal on the considered optical fiber. The signal modulated on a carrier together with the carrier can be called a channel or traffic channel.

Optical wave length multiplexing can be used in different optical fiber network configurations or architectures. Such an architecture is the FlexBus™ concept as described in B. S. Johansson et al., "Flexible bus: A self-restoring optical ADM ring architecture", Electronics Letters, Dec. 5, 1996, Vol. 32, No. 25, and U.S. Pat. No. 5,680,235, this architecture comprising a ring configuration of optical links connecting a plurality of nodes. The FlexBus™ concept has emanated from the need for protecting ring networks against fiber cuts and optical amplifier failures, and to solve the problem, often associated with optical ring network architectures, of circulating signals and noise.

In the FlexBus™ architecture one section or segment of the fiber ring is always made passive or inactive by means of optical switches or amplifiers. This intentionally introduced break effectively eliminates all problems associated with circulating signals and hence allows that less circuit components having lower performance can be used. In the case of a real failure of a section or link, the segment being intentionally made inactive is logically "moved" from its former position to the failed section, by making the inactive segment active and the faulty segment inactive, what also is called that "the bus flexes", and thereby the traffic is restored.

Different developments of the FlexBus™ may be found in for example WO 96/31025 and WO 96/24998.

SUMMARY

One problem with FlexBus™ and many other error handling algorithms in communication networks is that they can only take care of one error at the time. In FlexBus™ this is due to the fact that when a deactivated segment contains a fault it cannot be logically moved as described above until the fault is repaired, because else the bus would not work.

An object with the invention is to solve this problem by using protection links in parallel with the ordinary links. If a fault occurs the deactivated segment will logically move to the fault as usual. A bypass connection is made over protecting links parallel to the first deactivated segment and a second deactivated segment is created instead of the now deconnected deactivated faulty segment.

Since the second deactivated segment does not contain any fault it is possible to logically move in the case of the occurrence of a second fault. When the second deactivated segment has logically moved to the second fault a third deactivated segment will, in the same way, be created in parallel to the second deactivated segment. Thus, the third deactivated segment is possible to logically move in the case of a third fault etc. This is of course not extendable forever. It depends on the look of the net of protection links and it could eventually happen that the new fault occurs in a place where it is not remediable. It rarely occurs more than one or two errors at the same time though, so in practise there will be no problem.

The advantages with this are that a simple and cheap error handling method is provided, which is capable of taking care of many occurring errors.

If the links are also physically parallel a break in a protection link will probably occur at the same time as a break in an ordinary link. This problem is solved in an embodiment of the invention in that multi direction cross points are used to connect different protecting links in a more flexible way, forming a sort of net.

The advantages with this embodiment are that it is safer, that already existing links may be used as protecting links and that a more flexible bus reconfiguration is possible in the case when a larger part of the ordinary ring is faulty.

BRIEF DESCRIPTION OF THE DRAWINGS

The invention will now be described by way of non-limiting embodiments with reference to the accompanying drawings, in which.

DETAILED DESCRIPTION

The concept of the known FlexBus™ will be described below in more detail. It is to be understood that even though only Wavelength Division Multiplexing (WDM) will be described, the error handling method works also in other multiplexing techniques, using nodes with a corresponding design.

Figure 1:
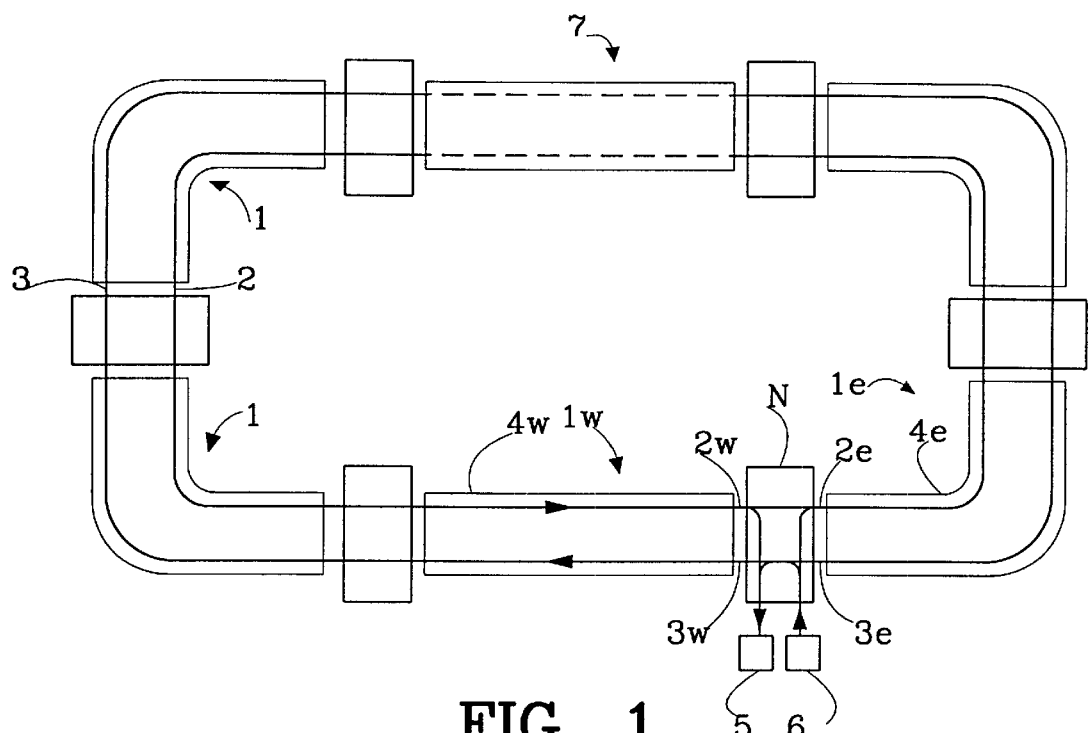
FIG. 1 is a general schematic view of an optical fiber network of WDM type using the flexible bus architecture.

A basic flexible bus structure for WDM communication on optical fibers is illustrated in FIG. 1. A plurality of optical add and drop nodes N are connected to each other by links 1 to form a network or bus comprising a physical ring structure having as basic elements a pair of optical fibers 2, 3 connected to form two parallel fiber rings.

Each fiber ring carries light propagating in a definite direction, the propagation directions of the two rings being opposite to each other. In one of the fiber rings light always propagates in the counter-clockwise direction, in the embodiment of FIG. 1 the inner ring 2, this direction being called the east direction hereinafter. In the other one 3 of the rings of the pair of fiber rings light always propagates in the opposite direction, i.e. in the clockwise direction, as seen in FIG. 1, this direction being called the west direction. These directions are taken as related to a considered node N of the network. In order to understand the concepts of "east" and "west" correctly it could be helpful to picture the ring as the Equator.

A node N in the bus structure is thus connected physically to two neighbouring nodes. The connections of a considered node N include a west physical link $1w$ comprising a west line cable $4w$ and an east physical link $1e$ comprising an east line cable $4e$, the other end of each link $1w$, $1e$ being connected to a neighbouring node.

Each piece $4w$, $4e$ of line cables comprises a pair of optical fibers $2w$, $3w$ and $2e$, $3e$ respectively. In one $2w$, $2e$ of the fibers of a fiber pair in a link $4w$, $4e$ light always propagates in one direction, in the anti-clockwise direction as seen in FIG. 1. In the other one $3w$, $3e$ of the fibers of the fiber pair in a link $4w$, $4e$ light always propagates in the opposite direction, in the clockwise direction, as seen in FIG. 1.

Furthermore, a node N may contain receivers 5 and transmitters 6 for converting optical signals to electrical signals and vice versa, the electrical signals being transmitted to or received from other devices, links or networks, not shown.

One segment of the ring structure is always deactivated, see the link 7 in FIG. 1, so that at least no light carrying traffic to be transferred in the network can pass through, in any direction. Pure signalling may be permitted to pass the deactivated segment, e.g. by using a special channel for signalling which bypasses the node in a special path. Thus in one way also the deactivated segment may be considered as a part of the bus.

The deactivated segment prevents that light signals and ASE noise circulate along the ring structure in several turns, ASE noise being amplified spontaneous emission particularly from in-line optical amplifiers which usually are included in the nodes N.

When there is a failure in a link between neighbouring nodes N, the network can be reconfigured so that this link/segment will then be the deactivated one, whereas the previously deactivated segment 7 now is activated and operates like the other active links 1 in the ring structure passing traffic in the two opposite directions. This will, in this application, be referred to as "moving" a deactivated segment, "moving" in this context meaning "logically moving". A flag is set somewhere indicating that the present deactivated segment contains an error and thus cannot be "moved".

Figure 2:
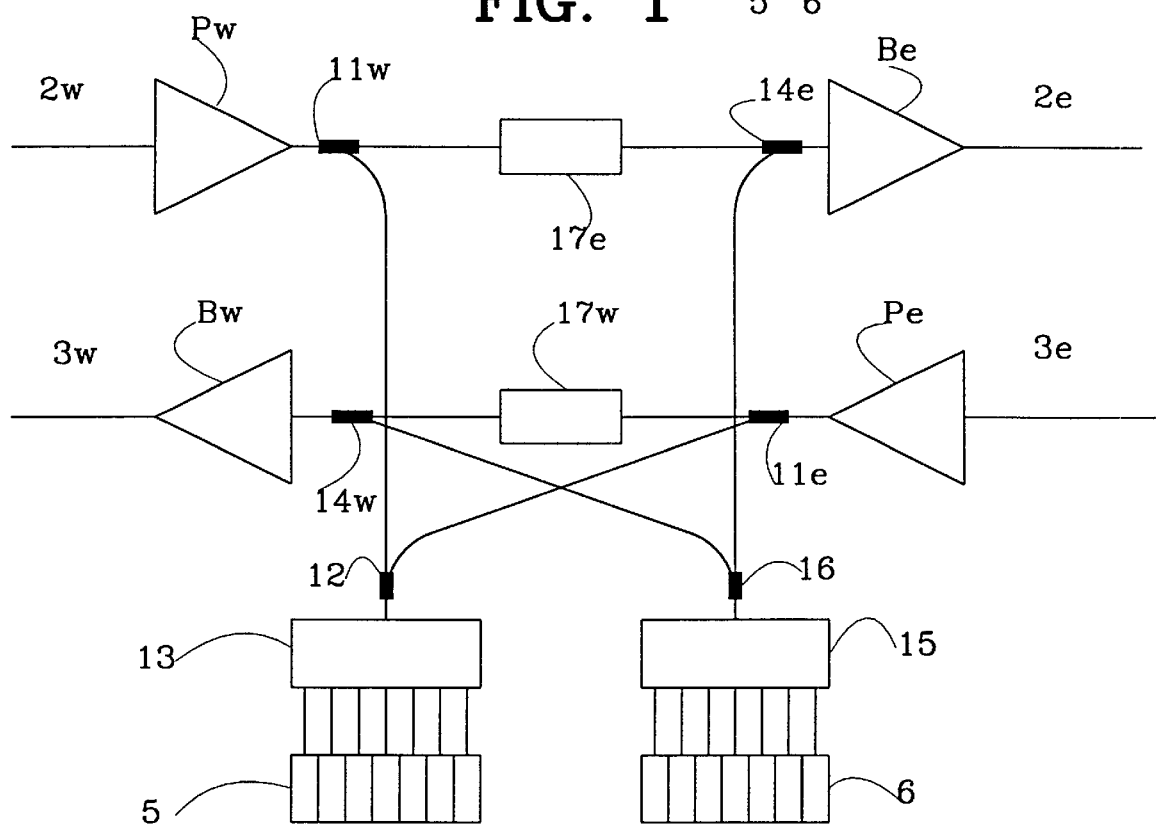
FIG. 2 is a block diagram of a prior art add and drop node of a simple configuration and intended to be used in the network of FIG. 1.

A basic structure of a node N in the basic flexible bus structure of FIG. 1 is shown in the block diagram of FIG. 2. The optical WDM traffic comprising a plurality of WDM channels having definite, separate wavelengths, each channel occupying a wavelength band around the wavelength of the channel, enters the node from the left or west and from the right or east directions on the fibers $2w$ and $3e$ respectively.

The incoming signals can be amplified in optional optical preamplifiers P$w$, P$e$ respectively. The incoming light is then split in drop couplers $11w$, $11e$. These couplers are optical power splitters that feed a part of the total power of the light propagating in one direction in the bus, through an optical combining coupler or power combiner 12, adding the deflected power portions from each direction to each other, to a bank 13 of filters, which can also be called an optical demultiplexer, having one or more band-blocking filters for wavelengths used in the transmission in the network. Thus the filter bank 13 filters out channels, each channel carrying information in a definite wavelength band, which are then forwarded to opto-electrical receivers 5, one optical receiver being arranged for each received channel.

The remaining part of the light power split in the drop couplers $11w$, $11e$ is forwarded through the node N, via optional band-blocking filters $17e$, $17w$ and is in add couplers $14e$, $14w$ mixed with new traffic to be added in the node. This new traffic is obtained from electro-optical transmitters 6, where each transmitter transmits optical signals of a wavelength band or a channel different from that of the other transmitters. The output signals of the transmitters 6 are added to each other in an optical combining coupler or optical multiplexer 15. The resulting signal is split in a splitting coupler 16 in two parts having equal power, each of the two parts being transmitted to one of the add couplers $14e$, $14w$.

The light signals obtained from the add couplers $14e$, $14w$ for each direction are fed to the fibers $3w$, $2e$, which are contained in the links connected to the node and carrying light going out from the node, through optional optical booster amplifiers B$e$, B$w$.

The west side or the east side amplifiers P$w$, B$w$, or P$e$, B$e$ respectively can be used to deactivate the respective links or segments connecting the node to the two neighbouring nodes in the case where this link is to be the deactivated one, such as in the case of a failure of this link, which can be caused e.g. by one of the fibers of the pair of the link being broken or by one of the optical amplifiers connected to this link being faulty.

Most of the bus structure and node design according to FIGS. 1, 2 are described in the above cited article by B. S. Johansson et al. and in the cited U.S. Pat. No. 08/421,734.

Figure 3A:
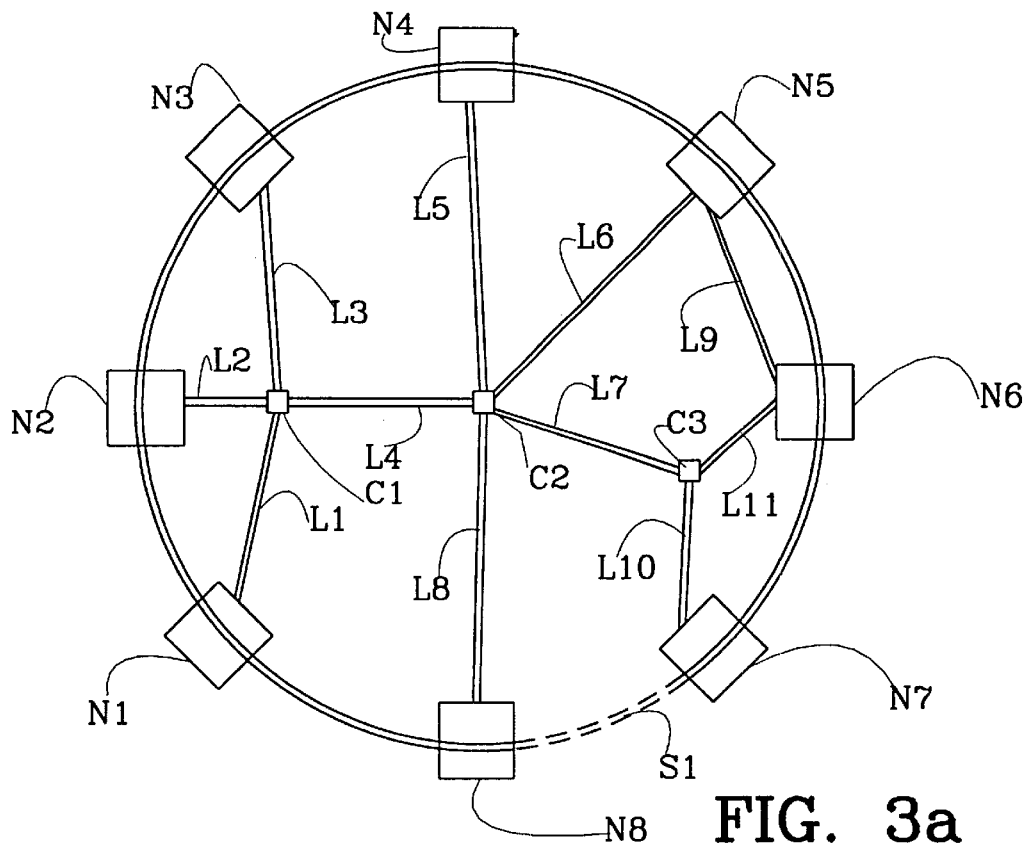
FIG. 3a is a general schematic view of a network according to the invention, with a working deactivated segment Si.

In FIG. 3a is shown according to the invention a communication network with, as an example, eight nodes N1–N8 connected in a ring as a FlexBus™ network as described above. Somewhere a deactivated segment S1 is situated. Extra bi-directional links L1–L11 for protection are connected between the different nodes N1–N8, via multi direction cross points C1–C3 or directly between the nodes.

If an error occurs in the ordinary communication network, traffic is instead directed via one or more of the protection links L1–L11 so that the error is by-passed.

The connections between the nodes N1–N8 may look in different ways, as may be seen in FIG. 3a. The important thing is that there is an extra way to get from one node to another node, without using the ordinary links.

Of course, it is possible to have, a bi-directional spare ring parallel to the ordinary ring, like the ninth protecting link L9 between the fifth and sixth nodes N5, N6. However, if you accidentally cut the ordinary ring, then you probably will cut the spare ring too. Using multi direction cross points will not only make it safer, but allows already existing links to be used and also allows a more flexible bus reconfiguration in the case when a larger part of the ordinary ring is erroneous.

Figure 3B:
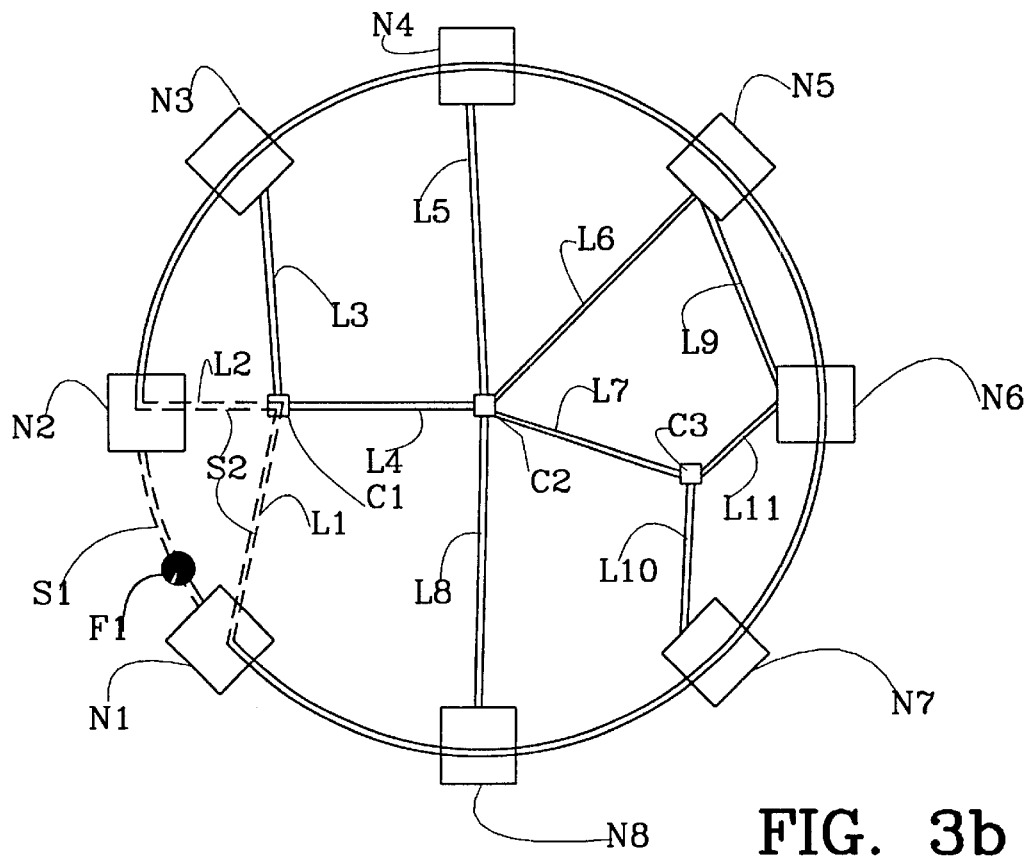
FIG. 3b shows the network in FIG. 3a with a non-working deactivated segment S1 and a working deactivated segment S2.

In FIG. 3a if a first fault F1 occurs for example between the first node N1 and the second node N2 the deactivated segment S1, wherever it is placed from the beginning, will move to the faulty part of the communication network, that is to the link between the first node N1 and the second node N2, as shown in FIG. 3b.

A flag will be set, indicating that the deactivated segment S1 contains a fault and thus cannot be moved until the error is repaired. The bus will work, but if another fault should occur the bus will not work anymore, since the deactivated segment should not be moved if there is a fault in the link. Thus, a "non-working" and unmoveable deactivated segment S1 containing a fault is obtained.

This problem is solved by the invention in that when a fault has occurred a connection is created over protecting links bypassing the non-working deactivated segment S1.

An extra "working" and movable deactivated segment S2 is thus created between the first node N1 and the second node N2 using the links L1 and L2 via the first cross point C1. The non-working deactivated segment S1 is disconnected from the bus and bypassed by the working deactivated segment S2, which forms part of the bus instead.

Of course it is not strictly necessary to place the new working deactivated segment S2 exactly between the same two nodes N1, N2 as the old non-working deactivated segment S1 as shown in FIG. 3b. It is possible to bypass the non-working deactivated segment S1 with a usual active link and place the new working deactivated segment S2 somewhere else on the bus, for example between the sixth N6 and seventh N7 node.

When the fault is repaired, the non-working deactivated segment S1 is reset and once again working and a part of the bus. The protection paths and the second deactivated segment S2 are no longer used, and the situation is once more that of FIG. 3a, but with the deactivated segment S1 between the first and the second nodes N1, N2.

Figure 3C:
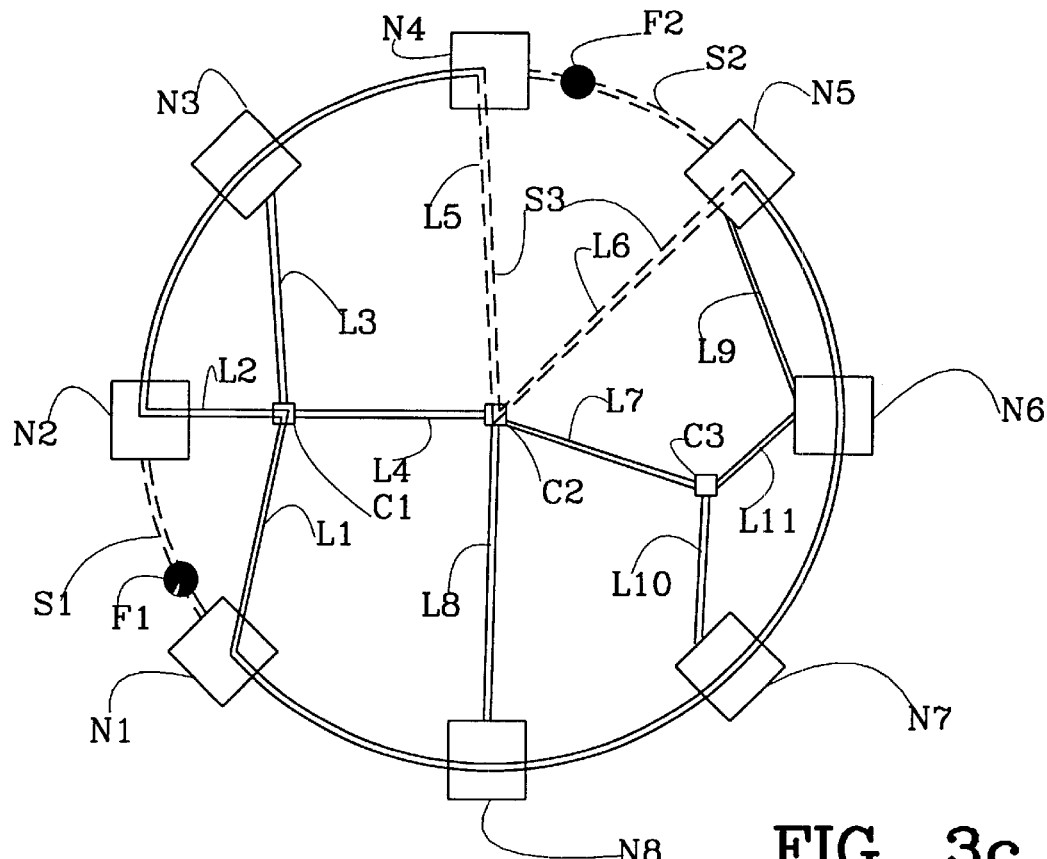
FIG. 3c shows the network in FIG. 3a, b with a non-working working deactivated segment S1, a non-working deactivated segment S2 and a working deactivated segment S3.

Now, it could happen that a second fault F2 occurs before the first fault F1 is repaired, for example between the fourth node N4 and the fifth node N5, see FIG. 3c. In this case the working deactivated segment S2 moves to the faulty part of the bus and becomes non-working and no longer a part of the bus. A new working deactivated segment S3 is created via the fifth L5 and sixth L6 links and the second cross point C2, thus bypassing the now non-working deactivated segment S2.

Figure 3D:
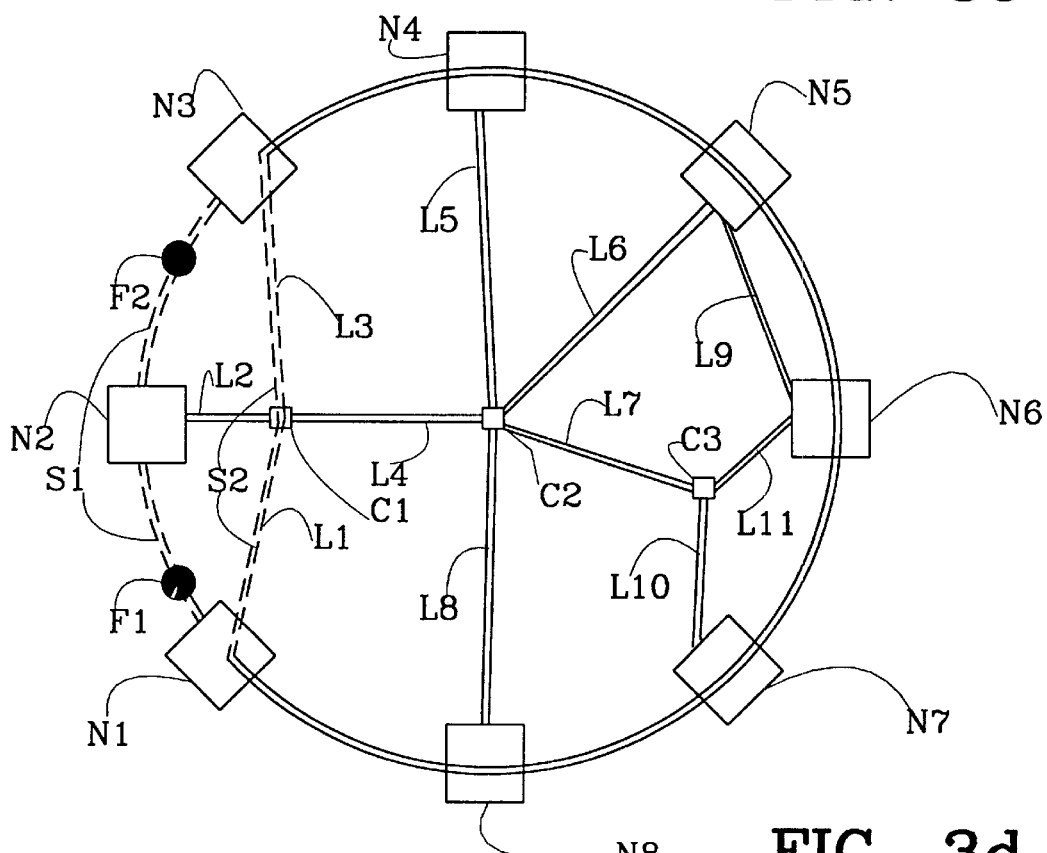
FIG. 3d shows the network in FIG. 3a, b with a non-working deactivated segment S1 and a working deactivated segment S2.

It could instead happen that the second fault F2 occurs in the link next to the link with the first fault F1, that is between the second node N2 and the third node N3, as shown in FIG. 3d. In this case an alternative can be to bypass both the first fault F1 and the second fault F2 at the same time if the node N2 between the two faults can be dispensed with. This is done by rearranging the working deactivated segment S2, so as to instead encompassing the protecting links L1 and L3.

Figure 4:
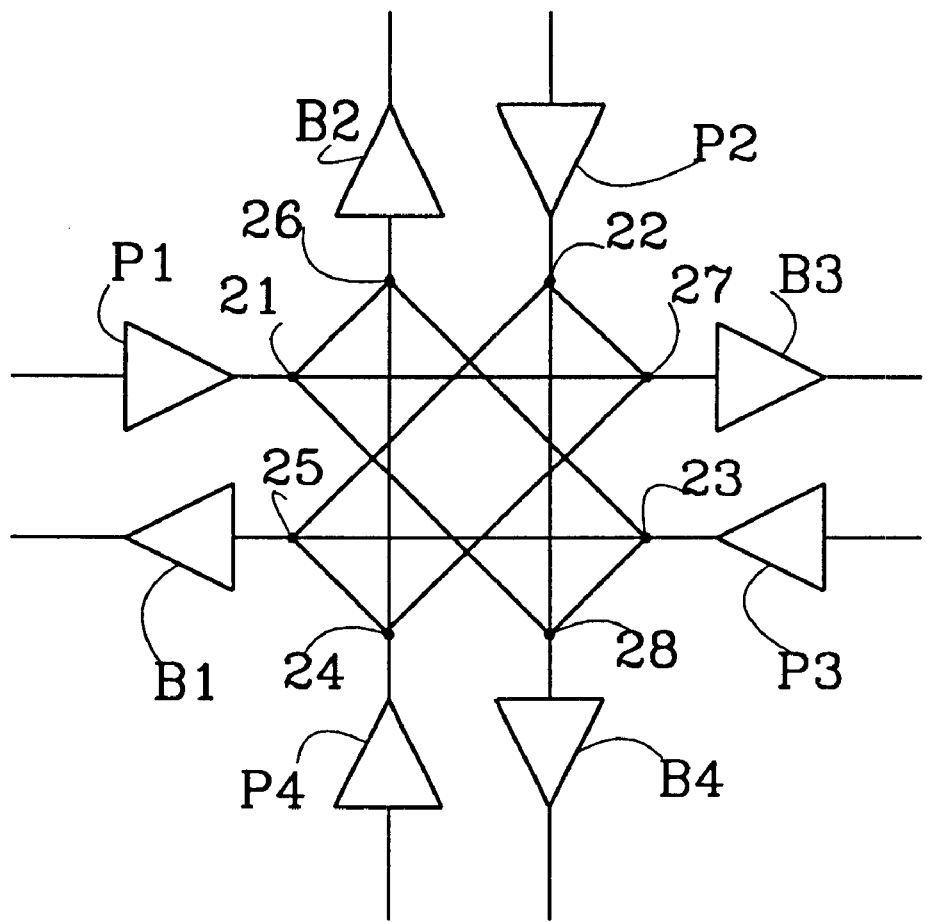
FIG. 4 is a block diagram of a multi-direction cross point.

The construction of a multi-direction cross point is simple, see FIG. 4 for an example with a possibility to connect four external bi-directional links. There are four optional preamplifiers P1, P2, P3, P4, four booster amplifiers B1, B2, B3, B4, four power splitters 21, 22, 23, 24 and four power combiners 25, 26, 27, 28. On each incoming external link there is a preamplifier P1, P2, P3, P4 connected to a power splitter 21, 22, 23, 24 connected with three of the power combiners 25, 26, 27, 28. Each power combiner 25, 26, 27, 28 is in its turn connected to a booster amplifier B1, B2, B3, B4.

This arrangement permits connection with any two external bi-directional links, by simply activating the preamplifiers P1, P2, P3, P4 and booster amplifiers B1, B2, B3, B4 on the two external links that are to be connected and by deactivating the other amplifiers.

To determine which amplifiers are to be activated and not, for example a separate signalling channel may be used, which does not carry any traffic, but only information of the status of the network, instructions for flexing and connecting protection links and such.

If the net of protecting links is not too complicated the instructions for connecting the protecting links may also be simple. For example, if the fault is on the west side of the node, as for the first node N1 in FIG. 3b, the instructions may in this case be "turn left until the next node is reached", which in this case would be the second node N2. The instructions from the second node N2 to the first node N1 would then at the same time be "turn right until the next node is reached". The connections in the multi-direction cross points, in this case only one, will be set up accordingly.

A node in a network using the invention may look in many ways. Some of them will be described below, which all more or less use the WDM node in FIG. 2 as a basis. The same reference numbers will be used for corresponding features. It is possible to construct new nodes by combining features from different figures. Of course, also nodes in FDM and TDM networks may be modified in a corresponding way.

Figure 5A:
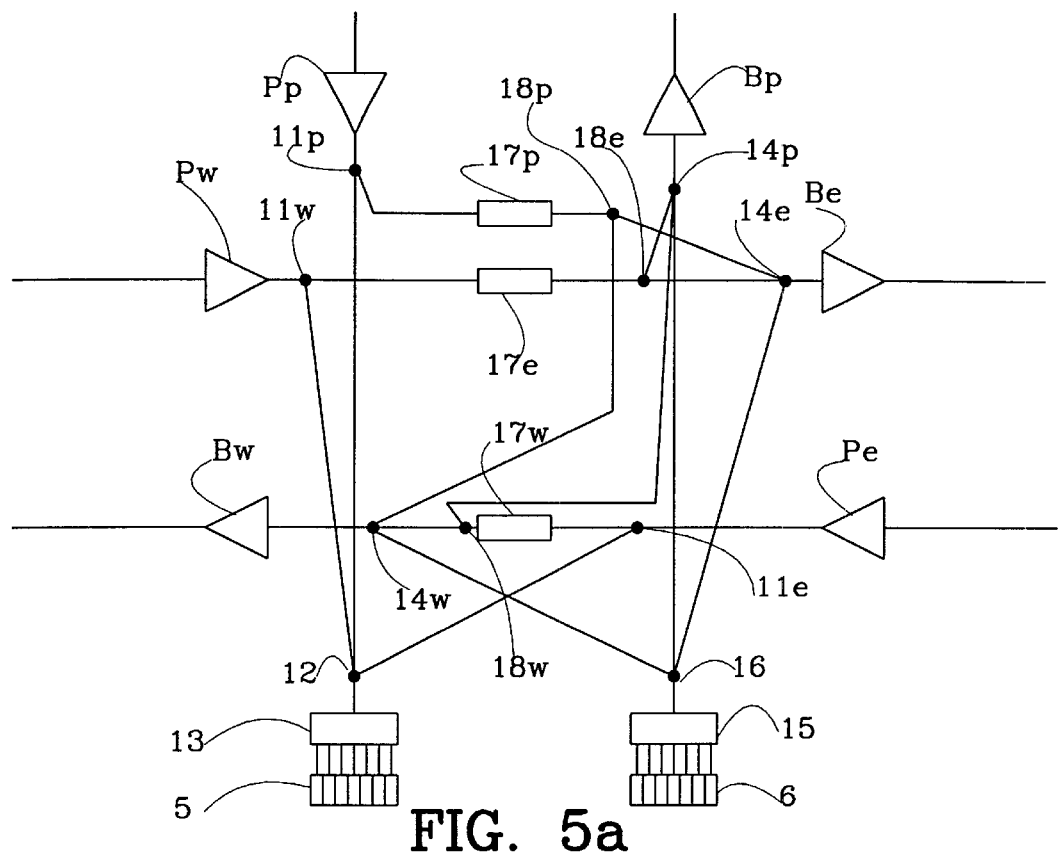
FIGS. 5a and 5b are block diagrams of add and drop nodes according to a first embodiment.
Figure 5B:
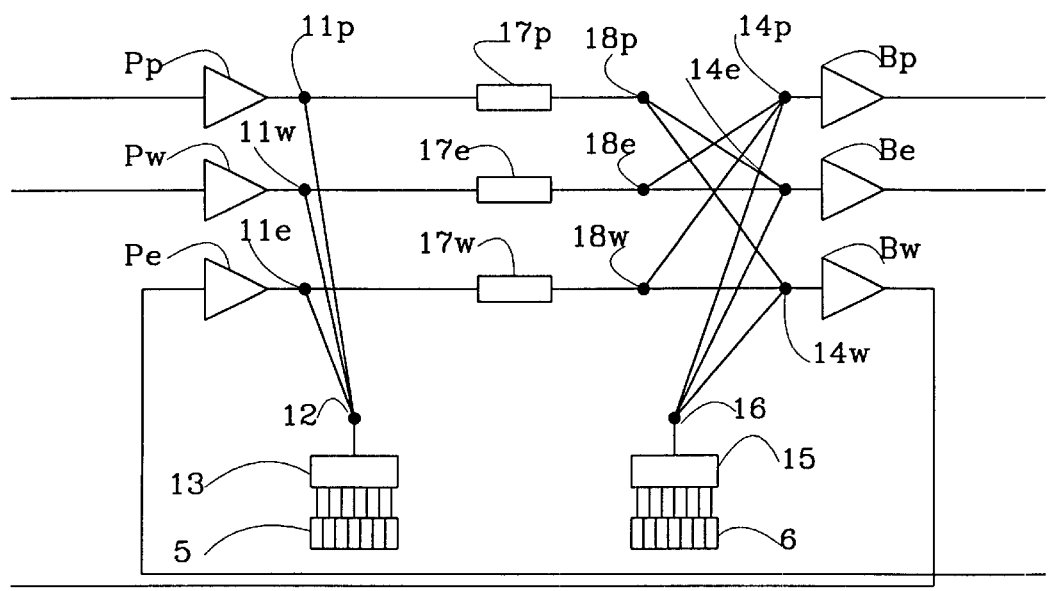

One embodiment of a node is shown in FIG. 5a, which is rearranged in the equivalent FIG. 5b for sake of clearness only. In addition to the two usual optional preamplifiers Pe, Pw and the two booster amplifiers Be, Bw, there is a third optional preamplifier Pp and a third booster amplifier Bp for connection with a protection link. There are also transmitters 6 with multiplexers 15, receivers 5 with demultiplexers 13, power splitters 11e, 11w, 11p, 16, 18p, 18e, 18w, power combiners 12, 14p, 14e, 14w and optionally three blocking filters 17p, 17e, 17w.

Each of the preamplifiers Pp, Pw, Pe is connected with one of the three first power splitters 11p, 11w 11e. Each first power splitter 11p, 11w, 11e is in its turn connected with, on the one hand the demultiplexers 13 via a power combiner 12, and on the other hand one of the three second power splitters 18p, 18e, 18w, either directly or via one of the optional blocking filters 17p, 17e, 17w.

Each of the second power splitters 18p, 18e, 18w is connected with two of the power combiners 14p, 14e, 14w. Each of the power combiners 14p, 14e, 14w is thus connected with two of the second power splitters 18*p*, 18*e*, 18*w*, but also with one of the booster amplifiers Bp, Be, Bw and with a power splitter 16 connected to the multiplexers 15.

The connections are thus made so as to provide connection between east and west, between east and the protection link or between west and the protection link.

Figure 10:
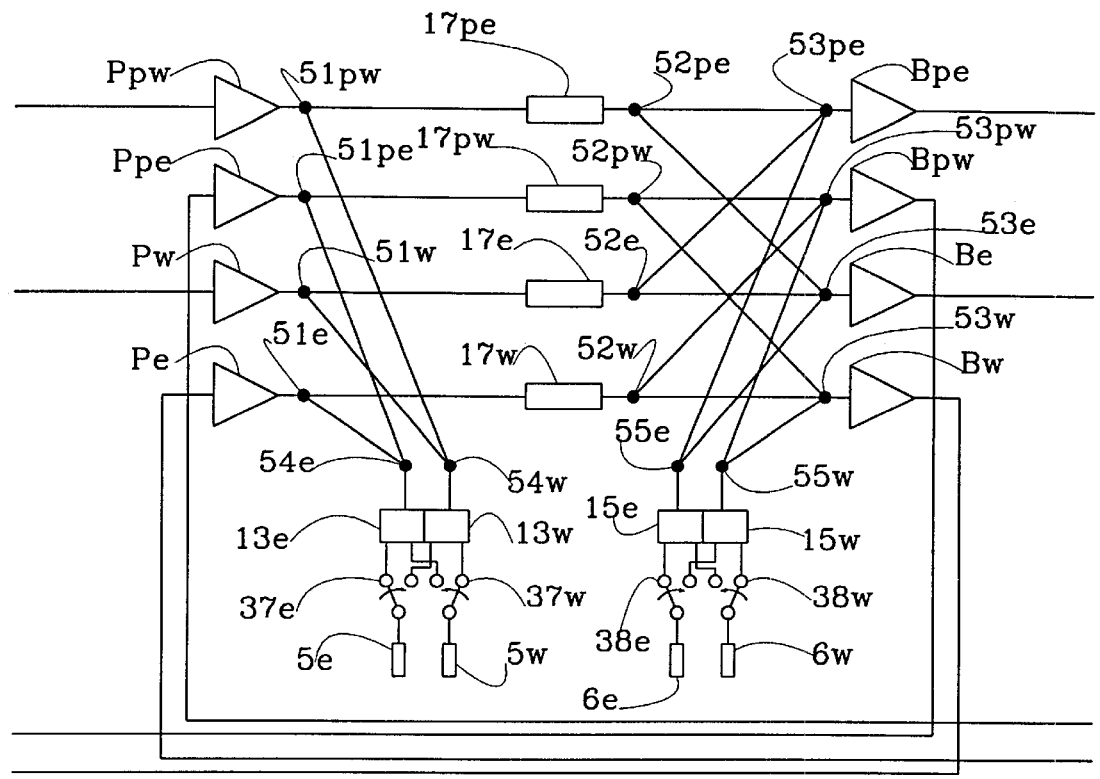
FIG. 10 is a block diagram of an add and drop node according to a sixth embodiment.
Figure 11:
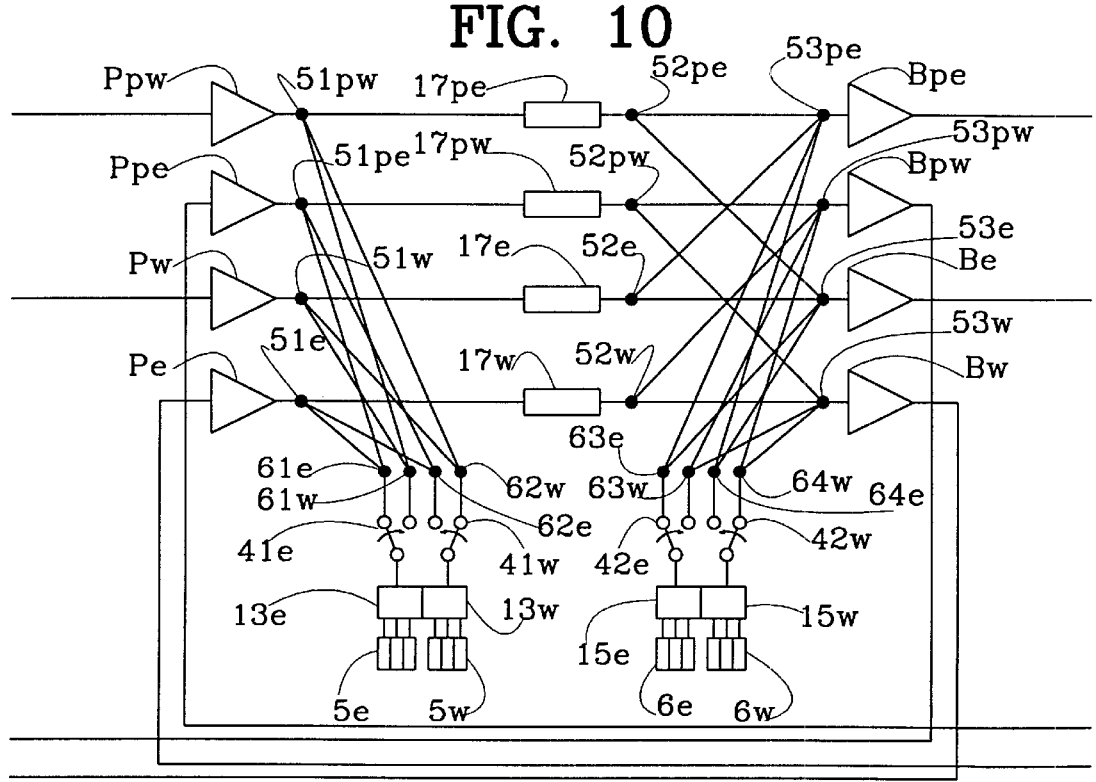
FIG. 11 is a block diagram of an add and drop node according to a seventh embodiment.

Of course, it would also be possible to have two protection links connected to the node; one for the east direction and one for the west direction, compare with the upper parts of FIGS. 10 and 11.

Figure 6:
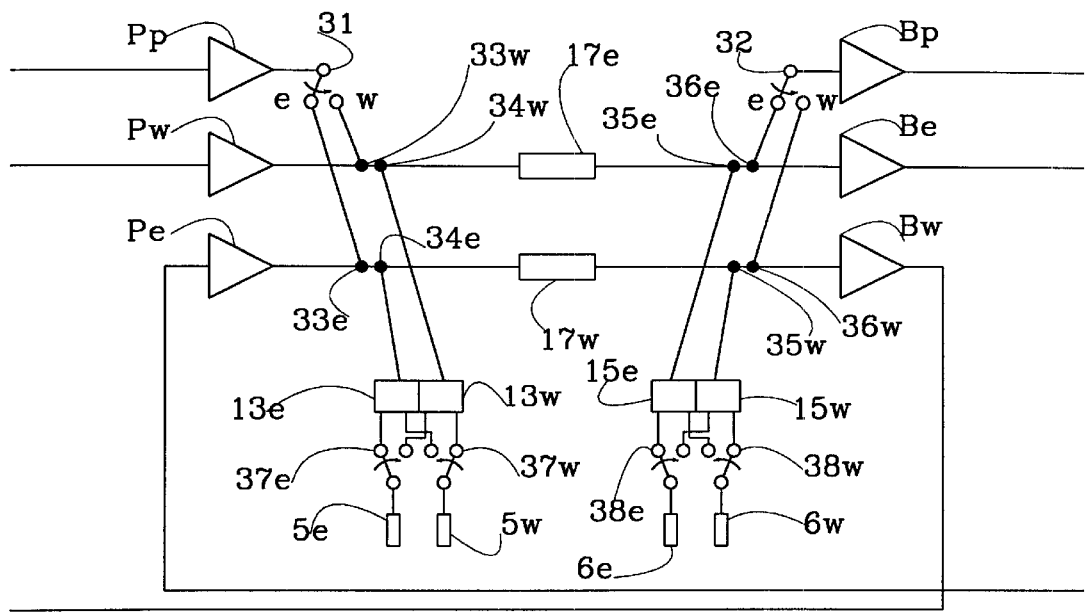
FIG. 6 is a block diagram of an add and drop node according to a second embodiment.

The invention may also be used, in more complicated nodes. In the following description FIGS. 6, 8 and 10 show nodes that are useful for all traffic cases; while in FIGS. 7, 9 and 11 nodes are shown for use in a system that reuse wavelengths in combination with a situation when all traffic channels are between adjacent nodes. They are all drawn in the rearranged way as in FIG. 5*b* for clearness only. The method of reusing wavelengths is beyond the scope of this application and will only be described briefly. Interested readers are instead referred to the Swedish applications SE9802070-4 and SE9802071-2.

A wavelength channel is said to be terminated in a node if it is received in the node, i.e. if there is a receiver 5 for this channel in the node. A wavelength channel is said to be reused if it is used for transmission from a node, i.e. if there is a transmitter 6 for this wavelength in said node, and at the same time the same wavelength is used for transmitting information in the same direction by another node without overlap of the transmission paths. Termination or reusing of wavelengths may be achieved by using inline blocking filters 17*e*, 17*w*, 17*pe*, 17*pw*.

Each of the blocking filters 17*e*, 17*w*, 17*pe*, 17*pw* in the considered node blocks only those wavelengths respectively which are terminated in the node for the respective direction. All wavelengths not terminated in the node, are just passed through the node in the east or west direction in a basically unaffected way.

In FIG. 6 each receiver 5*e*, 5*w* is connected to a switch 37*e*, 37*w*, which chooses if the wavelength of the receiver is to be received from the west preamplifier Pw, via west demultiplexers 13*w* or from the east preamplifier Pe, via east demultiplexers 13*e*. In a corresponding way each transmitter 6*e*, 6*w* is connected to a switch 38*e*, 38*w*, which chooses if the wavelength of the transmitter is to be transmitted to the west booster amplifier Bw, via west multiplexers 15*w* or the east booster amplifier Be, via east multiplexers 15*e*.

In this case the optional protectional preamplifier Pp and the protectional booster amplifier Bp, each are connected to a switch 31, 32, respectively. Those switches 31, 32 serve the purpose of choosing east or west going wavelengths.

In order to achieve this the two outputs of the switch 31 of the protectional preamplifier Pp are connected each to a power combiner 33*w*, 33*e* followed by a power splitter 34*w*, 34*e*. Each power combiner 33*w*, 33*e* is also connected to the output of a preamplifier Pw, Pe, while each power splitter 34*w*, 34*e* is connected to a band-blocking filter 17*e*, 17*w* and to one of the demultiplexers 13*w*, 13*e*.

Thus, if the link east of the node is non-working the switch 31 of the protectional preamplifier Pp is placed in its "east" position and the wavelengths coming from the east direction are received over the protecting link.

In a similar way the two inputs of the switch 32 of the protectional booster amplifier Bp are connected each to a power splitter 36*w*, 36*e* preceded by a power combiner 35*w*, 35*e*. Each power splitter 36*w*, 36*e* is also connected to the input of a booster amplifier Bw, Be, while each power combiner 34*w*, 34*e* is connected to one of the band-blocking filters 17*e*, 17*w* and to one of the multiplexers 15*w*, 15*e*.

Thus, if the link east of the node is non-working the switch 32 of the protectional booster amplifier Bp is placed in its "east" position and the east wavelengths are transmitted over the protecting link.

Figure 7:
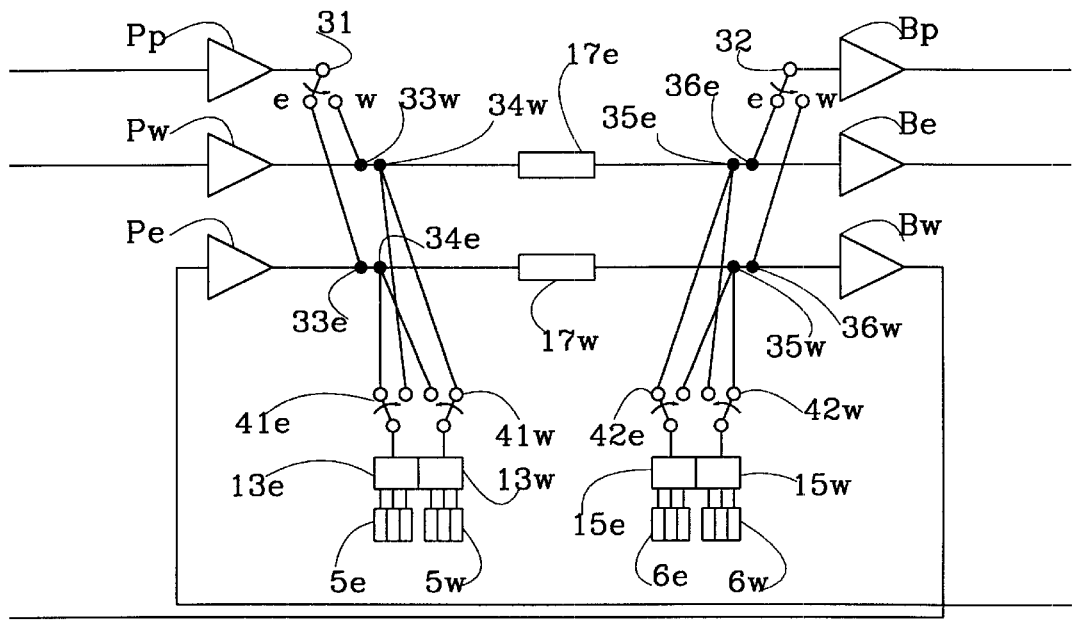
FIG. 7 is a block diagram of an add and drop node according to a third embodiment.
Figure 8:
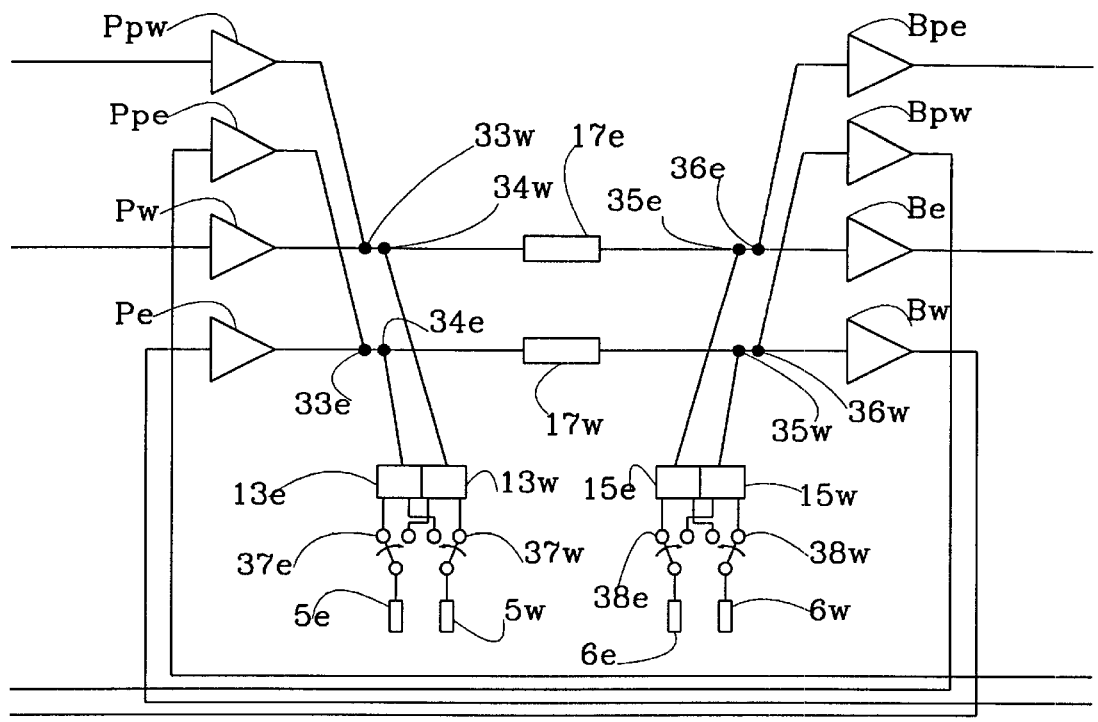
FIG. 8 is a block diagram of an add and drop node according to a fourth embodiment.

FIG. 7 is very much like FIG. 6. A difference is that the receivers 5*e*, 5*w* are connected directly to the demultiplexers 13*e*, 13*w* and that switches 41*e*, 41*w* instead are connected between the demultiplexers 13*e*, 13*w* and the power splitters 34*w*, 34*e*. In a corresponding way the transmitters 6*e*, 6*w* are connected directly to the multiplexers 15*e*, 15*w* and switches 42*e*, 42*w* are instead connected between the multiplexers 15*e*, 15*e* and the power splitters 35*w*, 35*e*.

FIG. 8 is also very much like FIG. 6. In this case, however, there are two protection preamplifiers Ppw, Ppe and two booster amplifiers Bpw, Bpe, instead of one preamplifier/booster amplifier with a switch.

Figure 9:
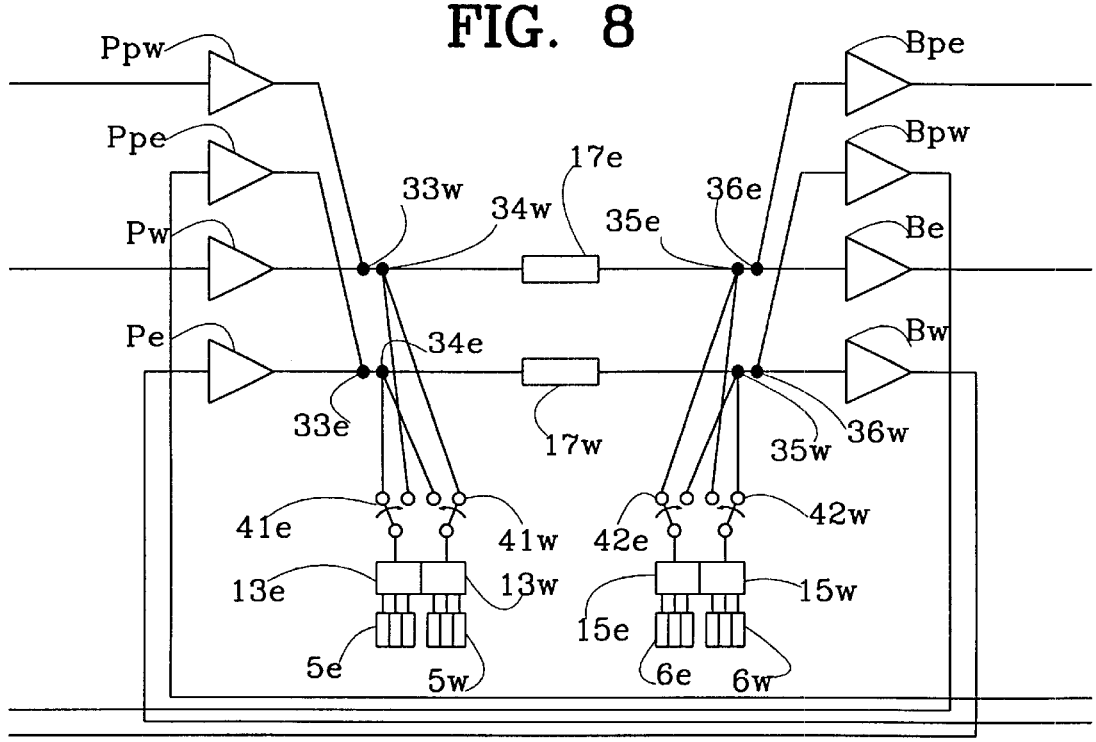
FIG. 9 is a block diagram of an add and drop node according to a fifth embodiment.

FIG. 9 is in its turn similar to FIG. 7, with the exception that there are two protection preamplifiers Ppw, Ppe and two booster amplifiers Bpw, Bpe, instead of one preamplifier/booster amplifier with a switch.

FIG. 10 is a combination of FIG. 8 and FIG. 5*b*. Each preamplifier Ppw, Ppe, Pw, Pe is connected to demultiplexers 13*e*, 13*w*, switches 37*e*, 37*w* and receivers 5*e*, 5*w* as in FIG. 8, via a first power splitter 51*pw*, 51*pe*, 51*w*, 51*e* each and one of two power combiners 54*e*, 54*w*. The first power splitters 51*pw*, 51*pe*, 51*w*, 51*e* are also each connected to a second power splitter 52*pe*, 52*pw*, 52*e*, 52*w*, via a band-blocking filter 17*pe*, 17*pw*, 17*e*, 17*w* each. The second power splitters 52*pe*, 52*pw*, 52*e*, 52*w* are also each connected to one protective and one "normal" booster amplifier Bpe, Bpw, Be, Bw, via power combiners 53*pe*, 53*pw*, 53*e*, 53*w*. Finally the power combiners 53*pe*, 53*pw*, 53*e*, 53*w* are also connected to multiplexers 15*e*, 15*w*, switches 38*e*, 38*w* and transmitters 6*e*, 6*w* as in FIG. 8, via one of two power splitters 55*e*, 55*w*.

The same goes for FIG. 11, which is a combination of FIG. 9 and FIG. 5*b*. Each preamplifier Ppw, Ppe, Pw, Pe is connected to switches 41*e*, 41*w*, demultiplexers 13*e*, 13*w*, and receivers 5*e*, 5*w* as in FIG. 9, via a first power splitter 51*pw*, 51*pe*, 51*w*, 51*e* each and two of four power combiners 61*e*, 61*w*, 62*e*, 62*w*. The first power splitters 51*pw*, 51*pe*, 51*w*, 51*e*are also each connected to a second power splitter 52*pe*, 52*pw*, 52*e*, 52*w*, via a band-blocking filter 17*pe*, 17*pw*, 17*e*, 17*w* each. The second power splitters 52*pe*, 52*pw*, 52*e*, 52*w* are also each connected to one protective and one "normal" booster amplifier Bpe, Bpw, Be, Bw, via power combiners 53*pe*, 53*pw*, 53*e*, 53*w*. Finally the power combiners 53*pe*, 53*pw*, 53*e*, 53*w* are also connected to switches 42*e*, 42*w*, multiplexers 15*e*, 15*w*, and transmitters 6*e*, 6*w* as in FIG. 8, via two of four power splitters 63*e*, 63*w*, 64*e*, 64*w*.

What is claimed is:

1. A communications network comprising at least two nodes, the network having two communication paths, carrying traffic in opposite directions and working as a bi-directional bus, the network always having a first inactive segment carrying no traffic, comprising:

detection means for detecting a faulty segment, when the faulty segment is not the first inactive segment, logic means for transferring the first inactive segment to the faulty segment by making the inactive segment active and the faulty segment inactive, disconnection means for disconnecting the first inactive segment from the bus, protecting links for creating a bypass connection over protection paths between the nodes which are on both sides of the faulty segment, means for making said bypass connection a part of the bus, and logic means for creating a second inactive segment on the bus.

2. The communications network according to claim 1, wherein the first inactive segment contains a fault, then a connection is provided over protection paths bypassing the first inactive segment and a second inactive segment is provided on the bus.

3. The communications network according to claim 2, wherein the second inactive segment is provided over the bypass connection.

4. The communications network according to claim 1, wherein the protection paths are essentially parallel to the communication paths.

5. The communications network according to claim 1, wherein the protection paths are coupled via multi-direction cross points to form a net between the nodes.

6. A method for fault handling in a communication network comprising at least two nodes, the network having two communication paths, carrying traffic in opposite directions and working as a bi-directional bus, the network always having a first inactive segment carrying no traffic, comprising the steps of detecting a faulty segment, when the faulty segment is not the first inactive segment, logically "moving" the first inactive segment to the faulty segment by making the first inactive segment active and the faulty segment inactive, disconnecting the first inactive segment from the bus, creating a bypass connection over protection paths between the nodes which are on both sides of the faulty segment, making said bypass connection a part of the bus, and creating a second inactive segment on the bus.

7. The method according to claim 6, wherein the second inactive segment is created over the bypass connection.

* * * * *